3,436,626
MASS CENTERING APPARATUS WITH MEANS TO SENSE MASS DISPLACEMENT FROM THE CENTER OF GRAVITY AND SERVO RECENTERING
Charles W. Phelps, Birmingham, Bert M. Morgan, Royal Oak, and Ronald F. Buck, Warren, Mich., assignors to General Motors Corporation, Detroit, Mich., a corporation of Delaware
Filed Oct. 6, 1964, Ser. No. 401,775
Int. Cl. G05b 5/01, 6/02
U.S. Cl. 318—18
17 Claims

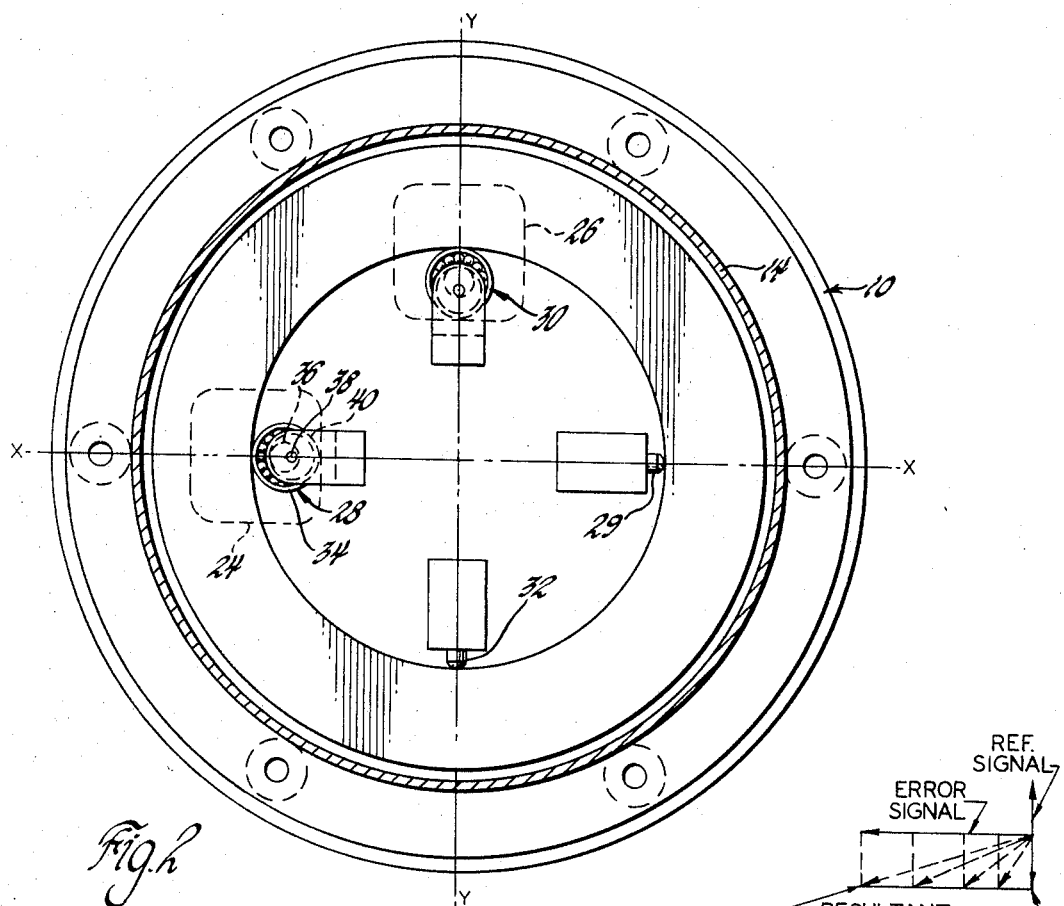
Fig. 2
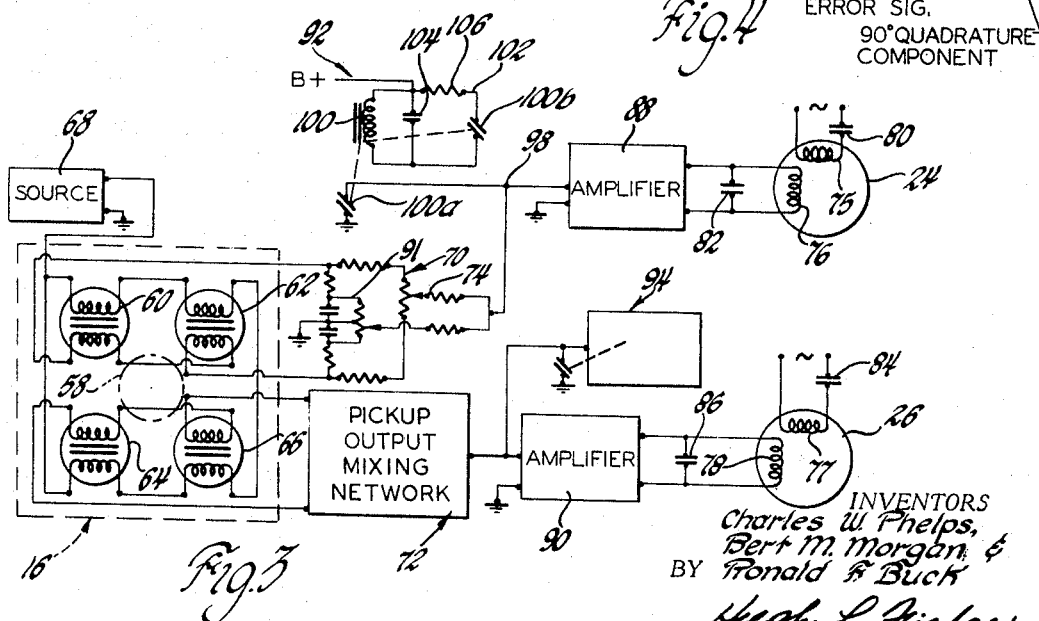
Fig. 4
Fig. 3

# United States Patent Office 3,436,626
Patented Apr. 1, 1969

ABSTRACT OF THE DISCLOSURE

Apparatus for mass centering a workpiece on a workpiece holder, which is nonrotatably and pivotally supported at its center of gravity. An electromechanical pickup senses the angular inclination of the workpiece holder and develops corresponding error signals. Positioning motors then, in response to these error signals, maneuver the workpiece on the holder until the error signals are nulled and the workpiece holder is returned to its horizontal position. When these error signals are nulled, the mass center of the workpiece is aligned with the center of gravity of the holder. To avoid motor hunting and overshooting, compensating networks combine a quadrature component with the error signals and also periodically interrupt the application of the error signals to the motors. Thereafter and with the mass center so located, the workpiece and holder are lifted from the pivotal support and held in place for a machining operation.

---

This invention relates to improvements in static mass centering apparatus.

It is well recognized that unbalance errors can be minimized if a workpiece, which is subsequently to be installed in a rotating assemblage, is machined with respect to its mass center, particularly when the workpieces are cast or forged. The usual apparatus for making this mass center determination conventionally relies upon rotation and then has some provision for marking the workpiece. The need for rotation makes the apparatus and its controls complicated and, therefore, increases the cost of the apparatus. Then too, the mere marking of the mass centered workpiece requires subsequent time consuming operations that involve accurately aligning the marked mass center of the workpiece with some point on a workpiece holder before the workpiece is machined.

Accordingly, the invention contemplates new and different mass centering apparatus that initially ascertains statically the mass center of a workpiece while on a holder so that the initial machining operation can be made relative to this mass center without requiring any further orientation of the workpiece. It is also proposed to accomplish the mass centering automatically without the need for rotating the workpiece, without transferring the workpiece to different stations, and without resort to complicated controls.

The controls represent a further unique feature of the invention and include provision for accurately and quickly aligning the workpiece relative to its mass center. The controls in an unusual and different way afford stability of operation by overcoming time consuming overshoot and hunting problems.

Then too, the invention contemplates apparatus wherein a high degree of accuracy is achieved by avoiding any friction produced errors or rotationally induced transients.

The foregoing and other objects and advantages of the invention will become apparent from the following description and the accompanying drawings, in which:

FIGURE 2 is a plan view of the apparatus looking in the direction of arrows 1—1 in FIGURE 1;

FIGURE 3 is a schematic diagram of the controls for the FIGURE 1 apparatus; and

FIGURE 4 is a voltage versus time graph showing the results of combining the error signal with a quadrature component.

Figure 1:
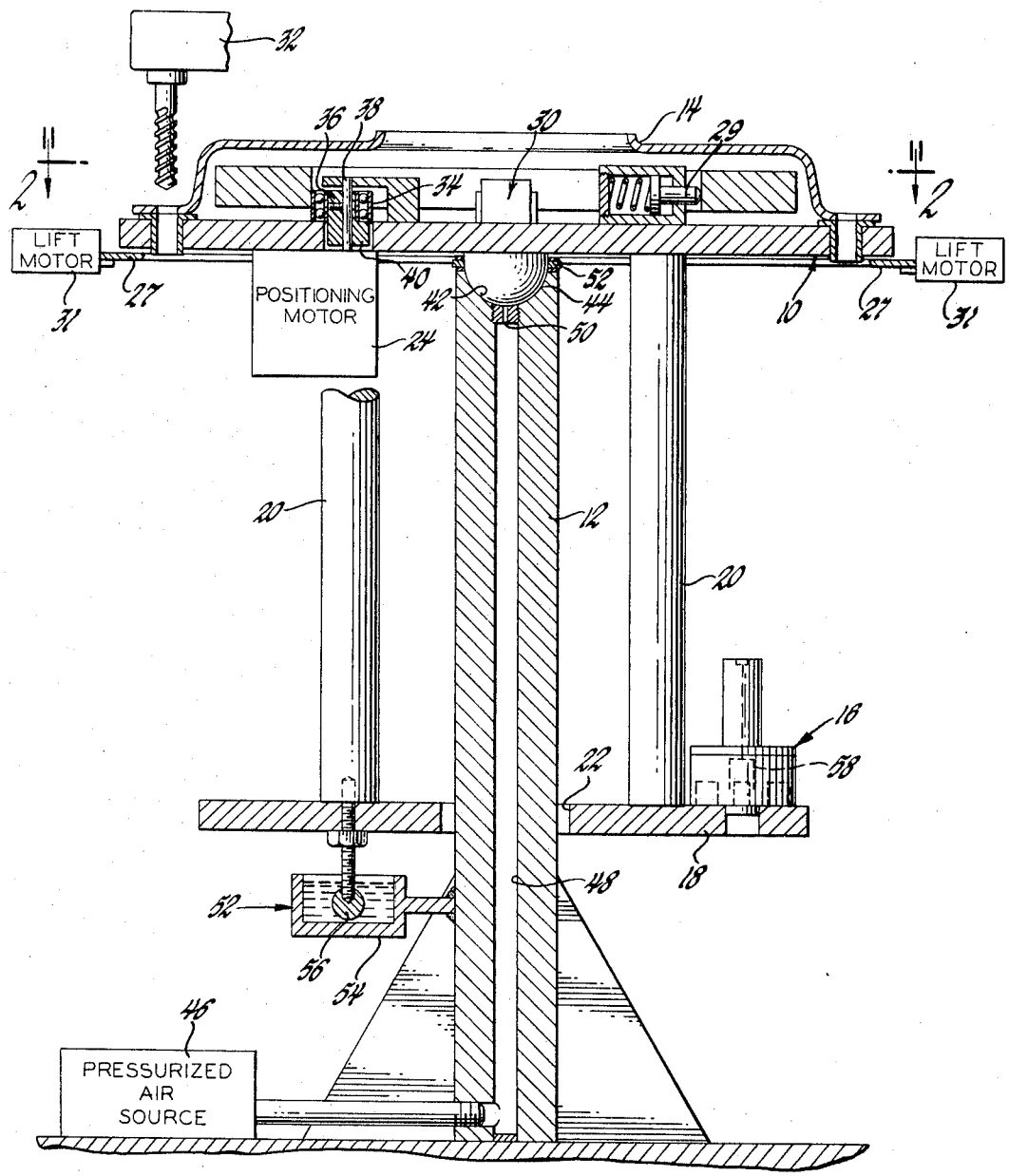
FIGURE 1 is a sectional view of apparatus incorporating principles of the invention.

Referring now to the drawings in detail and initially to FIGURE 1, the numeral 10 denotes generally a workpiece holder that is pivotally supported on a stationary upright column 12. The holder 10 is so balanced that its mass center or center of gravity coincides with the vertical axis of the upright column 12. Therefore, if the mass center of a workpiece, such as that shown at 14 and supported on the holder 10, is not coincident with this vertical axis, the holder 10 will incline or tilt from its normal horizontal position to an inclined position representing the mass center error; i.e., the direction and distance of the mass center from the mass center of the holder 10. This inclination is sensed by a pendulum type pickup 16 fixedly mounted on a platform 18. The platform 18 is suspended by rods 20 from the holder 10 and has an appropriate opening at 22 through which the upright column 12 extends. As will be explained more in detail, two positioning motors, denoted generally at 24 and 26, are so arranged as to maneuver the workpiece 14 in either of one or both of two angularly related directions until the mass centers of the holder 10 and the workpiece 14 coincide and accordingly align with the vertical axis of the upright column 12. The holder 10 will then return to its normal horizontal position.

For drilling purposes, provision is made for lifting the holder 10 off the support furnished by the upright column 12. This is done by moving a support ring 27 into engagement with the bottom or underside of the holder 10 and lifting upwardly by an appropriate lift motor 31 until the holder 10 is displaced a certain distance from the upright column 12. A suitable drill head 32 can be actuated to drill the mounting holes in the workpiece 14.

Since the mounting bolt circle will, after drilling, be concentric with the mass center of the workpiece 14 any additional machining operations can utilize this bolt circle as a location point. If no further machining is required the workpiece 14 can be incorporated into the final rotating assemblage.

The manner of mounting and maneuvering the workpiece 14 on the holder 10 can best be explained by referring both to FIGURES 1 and 2. For convenience, the holder 10 as viewed in FIGURE 2 has been assigned the illustrated X and Y axes. Arranged respectively on these X and Y axes are a motor-driven cam 28 and a spring biased plunger 29, and a motor-driven cam 30 and a spring biased plunger 32. The cams 28 and 30 and the plungers 29 and 32 are in addition to being positioned 90° apart also arranged so as to engage the workpiece 14 at some convenient internal diametrical portion thereof. Obviously, the shape of the workpiece 14 will determine the operating radius of the cams and plungers.

Since both cams 28 and 30 are identical only the X axis cam 28 will be described while referring to FIGURE 1. The cam 28 comprises a roller bearing 34, a pin 36 carried by the holder 10 and revolvably supporting the bearing 34, and a drive shaft 38 pivotally attached to an offset part of the pin 36. The shaft 38 is driven by the X axis positioning motor 24; consequently, when the shaft 38 is revolved the cam 28 will move along the X axis either toward or away from the center of the holder 10, the total travel being determined by the extent the rotational axes of the pin 36 and shaft 38 are offset. Rotation of the cam 30 generates the same movement but along the Y axis.

Because the movement of these cams 28 and 30 inwardly and outwardly does influence the mass center of the holder 10, compensation is desirable if accurate results are to be achieved. This is done by providing an offset weighted portion for the rod 36 as at 40. Hence, by proper calibration there should always be the same amount of mass on each side of the drive shaft 38 regardless of its angular disposition. The positions of the cams 28 and 30 will, therefore, have no influence upon the horizontal position of the holder 10.

As has been explained, the holder 10 is capable of being lifted from the pivotal support provided by the upright column 12. To eliminate any potential friction-produced problems and enable this separation to be conveniently made, a hydrodynamic type bearing is provided by forming the upper part of the upright column with a spherical seat 42 that mates with a half-ball 44 formed on the bottom of the holder 10. A cushion of air is formed between the two surfaces so that there is actually no physical contact. The air is derived from a pressurized air source at 46 that communicates with the spherical seat 42 via a central opening 48 and an orifice 50, both in the upright column 12. Rotation of the holder 10 relative to the column 12 can be prevented by a slot and pin connection illustrated at 52.

Further facilitating the accurate operation of the apparatus is a dampener, viewed generally at 52 in FIGURE 1. The dampener 52 comprises merely a trough 54 that is joined to the column 12 and contains a silicone fluid and an immersed vane 56, or the like, that is attached to the platform 18. In operation, rapid movements of the holder 10 are impeded by the action of this dampener 52.

The control system illustrated in FIGURE 3 derives its input, as mentioned, from the pendulum type pickup 16. This pickup 16, as viewed, comprises a four-pole wound stator or electromagnet whose poles encircle a wire-suspended armature 58. In this embodiment there are in effect four transformers identified by the numerals 60, 62, 64 and 66. These transformers function as sets, with transformers 60 and 62 and transformers 64 and 66 respectively oriented with the X and Y axes. The primary windings for each transformer are all connected in series and served by the same AC source, shown generally at 68. This may be the conventional and readily available 60 c.p.s., 110 volt power. The secondaries of the transformers 60 and 62 and the secondaries of the transformers 64 and 66 are arranged, as shown, in series opposition and are connected respectively to sensitivity and nulling circuits 70 and 72.

The operation of the pickup 16 is based on the well known principles that a change in the air gap between the armature 58 and the different transformer cores or poles causes a change in reluctance, which in turn can be measured as a variation in the output voltage. Hence, with all of the primaries connected to the same 60 cycle source, the outputs are all of the same phase and, therefore, amplitude intelligence is derived. For instance, if the armature 58 is equidistant from the cores of the transformers 60 and 62 the voltages developed by their secondaries will be equal and opposite and, thus, cancel. On the other hand, if the air gap between the core of the transformer 60 and the armature 58 is decreased, its secondary voltage will increase; whereas the secondary voltage of the transformer 62 will decrease. With the armature 58 closer to the core of transformer 60 the workpiece 14 will have to be moved to the right, as viewed in FIGURE 2, along the X axis and toward the center of the holder 10 in order to return the armature 58 to its null position and, likewise, the holder 10 to its normal horizontal position.

The pickup output mixing networks 70 and 72 are identical and are merely bridge circuits so adjusted as to provide a null output when the armature 58 is centrally located relative to the cores of each of the transformers 60, 62, 64 and 66. The necessary null is attained by providing an adjustable resistor 74.

The X and Y axes positioning motors 24 and 26 are of the two-phase type with each respectively including quadrature related reference and control windings 75 and 76 and 77 and 78. In order for the motors 24 and 26 to develop a torque reflecting the amplitude of the error signals, the reference and control signal phases must be 90° displaced from each other. Since preferably both the pickup 16 and the reference windings 75 and 77 are fed from the same AC source 68, the necessary 90° displaced phase difference is obtained by incorporating capacitors 80, 82 and 84, 86, respectively, as illustrated in FIGURE 3. The power necessary to drive the positioning servo motors 24 and 26 is furnished by conventional amplifiers 88 and 90.

The problem of overshoot and hunting by the motors 24 and 26; i.e., the tendency for the motors to move the workpiece 14 past the null establishing point, then commence a period of back and forth adjustment until the null is finally established; is solved without utilizing any velocity feedback loop. This is done by compensating networks, with that for the X channel being exemplary and including a phase shifting circuit 91, shown incorporated in the bridge circuit, and an interrupter circuit 92. The compensating network for the Y channel is identical and also has a phase shifting circuit (not shown) in the pickup output mixing network 72 and an interrupter circuit assigned the numeral 94. Only the network comprising circuits 91 and 92 will be described in detail. The phase shifting circuit 91 makes possible the inclusion of a 90° quadrature component with the X axis error signal obtained at the resistor 74. The interrupter circuit 92 periodically transfers the error signal to ground through the combined action of a relay 100 and an oscillator 102.

The reason for the inclusion of a 90° quadrature component with the error signal is best understod by referring to a diagram of FIGURE 4. Illustrated is a reference signal, which will be applied to the positioning motor reference winding 75, and an error signal, which will be applied to the control winding 76. These signals are 90° out of phase as mentioned. The phase shifting circuit 91 in adding a quadrature component, which is mixed with the error signal, produces a resultant error signal identified by the broken lines. As the positioning motor 24 drives the workpiece 14 toward the null position the error signal, of course, diminishes and, therefore, motor speed must necessarily decrease. The resultant error signals cause the motor speed to decrease even faster than the error signal. This is because of the fact that with the error signal and the referenec signal 180° out of phase, the positioning motor 24 will not develop an output torque. Hence, with the error signal approaching this 180° out of phase relationship due to the introduction of a quadrature component, the torque output from the motor 24 is decreased. This avoids the tendency for the motor 24 to drive the workpiece 14 past the null point due to inertia and other factors.

The relay 100 operates two sets of normally open contacts 100a and 100b. The oscillator 102 for operating the relay 100 is of the simple relaxation type comprising a condenser 104 connected across the relay 100 and a B+ source. Initially, the condenser 104 will charge until the winding of the relay 100 is energized enough to close the contacts 100a and 100b. The condenser 104 then will discharge through a resistor 106. In the meantime the error signal will have been shunted by the now closed contacts 100a to ground for the interval required for the condenser 104 to discharge. After the condenser 104 is discharged to a certain minimum level the relay 100 will drop out. Again the contacts 100a and 100b will open and the error signal will be re-applied to the input of the amplifier 88.

As the positioning motors 24 and 26 are moving the workpiece 14 to achieve mass balance, the position of the workpiece holder 10 is always lagging behind the instantaneous position of the workpiece 14. This lag is produced largely by the action of the dampener 52. The cyclic shunting of the error signals by the action of the interrupter circuits 92 and 94 keeps the positioning motors 24 and 26 inoperative for a certain increment of time. This short period of time that the positioning motors 24 and 26 are inoperative allows the workpiece holder 10 to, in effect, catch up to the absolute position of the workpiece 14. During the next increment of time when the positioning motors 24 and 26 are operative, the amplifier's "sample" error signals that closely indicate the exact position of the workpiece 14 with respect to the workpiece holder 10, and thus reduces the overshooting and the undesired hunting.

Summarizing the operation of the apparatus, the workpiece 14 is installed on the holder 10 and if the mass center of this workpiece 14 is not aligned with the pivotal axis of the holder 10 and, accordingly, the vertical axis of the upright column 12, the holder 10 will incline. This inclination is transferred to the wire suspended armature 58, unbalancing the transformer outputs in the way explained. Consequently, X and Y axes error signals are developed respectively in the pickup output mixing networks 70 and 72. These X and Y axes error signals are attenuated by the interrupter circuits 92 and 94 and by the 90° quadrature insertion by the phase shifting circuits in each of the pickup output mixing networks 70 and 72. These error signals are then applied to the inputs of the amplifiers 88 and 90.

The amplifier X and Y axed error signals are next applied respectively to the X and Y axes positioning motor control windings 76 and 78 through the phase shifting capacitors 82 and 86, respectively, and cause the positioning motors 24 and 26 to revolve the cams 28 and 30 the amount needed to move the workpiece 14 in the X and Y axes directions for aligning the mass center of the workpiece 14 with the pivotal axes of the holder 14. The X and Y axes reference signals are likewise phase snifted by the capacitors 80 and 84, respectively, to obtain an over-all phase shift and consequently the difference required to operate the motors 24 and 26 with the source 68. With the workpiece 14 having its mass center properly located, the lift motor 30 can be actuated and, through the support ring 28, move the holder 14 off the spherical seat 42 so as to permit the drilling operation by the drill head 32. Subsequently, the holder 14 is returned to its seat and the drilled workpiece 14 replaced by another.

As will be appreciated, the mass centering by the apparatus is done automatically, with the workpiece actually being moved to the proper position for the machining step. The influence from external factors, such as friction, have been eliminated. Moreover, the compensating networks produce attenuation in an inexpensive way, thus preventing overshoot of the positioning motors 24 and 26. Then too, a single power source can be used for the entire control system.

The invention is to be limited only by the following claims.

What is claimed is:

1. Apparatus for mass centering a workpiece comprising the combination of a holder for movably supporting the workpiece, means pivotally supporting the workpiece holder at the center of gravity thereof so that the holder will pivot from a substantially horizontal position to an inclined position representing the disposition of the mass center of the workpiece relative to the center of gravity of the holder, means sensing the displacement of the workpiece holder from the horizontal position and developing a corresponding output, and positioning means including cam means movable relative to the holder and engageable with the workpiece, the cam means being operative in response to the output for maneuvering the workpiece relative to the holder so that the mass center of the workpiece and the center of gravity of the holder are substantially aligned.

2. Apparatus for mass centering a workpiece comprising the combination of a holder for movably supporting the workpiece, means including a bearing for pivotally and nonrotatably supporting the workpiece holder at the center of gravity thereof so that the holder will pivot from a substantially horizontal position to an inclined position representative of the dispostiion of the mass center of the workpiece relative to the center of gravity of the workpiece holder, means sensing the displacement of the workpiece holder from the horizontal position and developing a corresponding output, positioning means responsive to the output for maneuvering the workpiece relative to the workpiece holder until the mass center of the workpiece of the center of gravity of the workpiece holder coincide, and means lifting the workpiece and workpiece holder from the bearing for permitting the workpiece to be machined in accordance with the established mass center.

3. Apparatus for mass centering a workpiece comprising the combination of a holder for movably supporting the workpiece, means pivotally supporting the workpiece holder at the center of gravity thereof so that the holder will pivot from a substantially horizontal position to an inclined position representing the disposition of the mass center of the workpiece relative to the center of gravity of the holder, means sensing the displacement of the workpiece holder from the horizontal position and developing a corresponding output, and positioning means including a cam surface movably mounted on the holder and engageable with the workpiece and motor means operative in response to the output for moving the cam surface so as to cause the mass center of the workpiece to be aligned with the center of gravity of the workpiece holder.

4. Apparatus for mass centering a workpiece comprising; the combination of a holder for movably supporting the workpiece; means pivotally supporting the workpiece holder at the center of gravity thereof so that the holder will pivot from a substantially horizontal position to an inclined position representing the dispositon of the mass center of the workpece relative to the center of gravity of the holder; means sensing the displacement of the workpiece holder from the horizontal position and developing a corresponding output; and positioning means including a cam surface movably mounted on the holder and engageable with the workpiece, means correcting for mass center errors resulting from movement of the cam surface, and motor means operative in response to the output for moving the cam surface so as to align the mass center of the workpiece and the center of gravity of the holder.

5. Apparatus for mass centering a workpiece comprising; the combination of a holder for movably supporting the workpiece; means nonrotatably and pivotally supporting the workpiece holder at the center of gravity thereof so that the holder will pivot from a substantially horizontal portion to an inclined position representing the disposition of the mass center of the workpiece relative to the center of the gravity of the holder; means sensing the displacement of the workpiece holder from the horizontal position and developing a corresponding output; and positioning means including a cam surface movably mounted on the holder and engageable with the workpiece, the cam surface having a compensating portion thereof so arranged as to compensate for mass center changes resulting from changes in the relative position of the cam surface and the holder, and motor means operative in response to the output for moving the cam surface so as to align the mass center of the workpiece and the center of gravity of the holder.

6. Apparatus for mass centering a workpiece comprising; the combination of a holder for movably supporting the workpiece; means pivotally supporting the workpiece holder at the center of gravity thereof so that the holder will pivot from a substantially horizontal position to an inclined position representing the disposition of the mass center of the workpece relative to the center of gravity of the holder; means sensing the displacement of the workpiece holder from the horizontal position in two angularly related directions and developing corresponding outputs; and positioning means including a pair of spaced cams revolvably positioned on the holder about offset axes and operative to move the workpiece in the two angularly regulated directions, a compensating weight revolvable with each cam and so positioned relative to the axis thereof as to compensate for mass center changes due to rotation of the cam, and motor means responsive to the output for revolving the cams so as to move the workpiece in the angularly related directions required to align the mass center of the workpiece and center of gravity of the holder.

7. Apparatus for mass centering the workpiece comprising; the combination of a holder for movably supporting the workpiece; air bearing means nonrotatably and pivotally supporting the workpiece holder at the center of gravity thereof so that the holder will pivot from a substantially horizontal position to an inclined position representing the disposition of the mass center of the workpiece relative to the center of gravity of the holder; means sensing the displacement of the workpiece holder from the horizontal position in two quadrature related directions and developing corresponding outputs; and positioning means including a pair of quadrature spaced cams revolvably positioned on the holder about offset axes and operative to move the workpiece in the two quadrature related directions, a compensating weight revolvable with each cam and so positioned relative to the axis thereof as to compensate for mass center changes due to rotation of the cam, and a pair of motors each responsive to one of the outputs and arranged to revolve one of the cams so as to align the mass center of the workpiece and center of gravity of the holder.

8. Apparatus for mass centering the workpiece comprising, the combination of a holder for movably supporting the workpiece, means pivotally supporting the workpiece holder at the center of gravity thereof so that the holder will pivot from a substantially horizontal position to an inclined position representing the disposition on the mass center of the workpiece relative to the center of gravity of the holder, means sensing the displacement of the workpiece holder from the horizontal position and developing a corresponding error signal, workpiece positioning means including a cam surface movable relative to the holder and engageable with the workpiece and motor means operative in response to the error signal to maneuver the cam surface and accordingly the workpiece relative to the holder so as to align the mass center of the workpiece and the center of gravity of the holder, and a compensating network for stabilizing the operation of the motor means, the compensating network including means attenuating the error signal.

9. Apparatus for mass centering a workpiece comprising, the combination of a holder for movably supporting the workpiece, means pivotally suporting the workpiece holder at the center of gravity thereof so that the holder will pivot from a substantially horizontal position to an inclined position representing the disposition of the mass center of the workpiece relative to the center of gravity of the holder, electromechanical means sensing the displacement of the workpiece holder from the horizontal position and developing a corresponding error signal, workpiece positioning means including a cam surface movable relative to the holder and engageable with the workpiece and motor means operative in response to the error signal to maneuver the cam surface and accordingly the workpiece relative to the holder so as to align the mass center of the workpiece and the center of gravity of the holder, and a compensating network for stabilizing the operation of the motor means, the compensating network including means combining a phase shifted component with the error signal so that the effective error signal applied to the motor means causes the motor means, speed to decrease faster than the error signal.

10. Apparatus for mass centering a workpiece comprising, the combination of a holder for movably supporting the workpiece, means pivotally supporting the workpiece holder at the center of gravity thereof so that the holder will pivot from a substantially horizontal position to an inclined position representing the disposition of the mass center of the workpiece relative to the center of gravity of the holder, electromechanical means sensing the displacement of the workpiece holder from the horizontal position and developing an error signal of corresponding amplitude, workpiece positioning means including a cam surface movable relative to the holder and engageable with the workpiece and motor means operative in response to the error signal to maneuver the cam surface and accordingly the workpiece relative to the holder in accordance with the amplitude of the error signal so as to align the mass center of the workpiece and the center of gravity of the holder, a compensating network for stabilizing the operation of the motor means, the compensating network including means periodically interrupting the application of the error signal to the motor means.

11. Apparatus for mass centering a workpiece comprising, the combination of a holder for movably supporting the workpiece, means pivotally supporting the workpiece holder at the center of gravity thereof so that the holder will pivot from a substantially horizontal position to an inclined position representing the disposition of the mass center of the workpiece relative to the center of gravity of the holder, electromechanical means sensing the displacement of the workpiece holder from the horizontal position and developing an error signal of a corresponding amplitude, workpiece positioning means including a cam surface movable relative to the holder and engageable with the workpiece and motor means responsive to the error signal, the motor means being so arranged as to maneuver the cam surface and accordingly the workpiece relative to the holder in accordance with the amplitude of the error signal so as to align the mass center of the workpiece and the center of gravity of the holder, and a compensating network for stabilizing the operation of the motor means, the compensating network including means combining a phase shifted component with the error signal so that the effective error signal impressed upon the motor means causes the motor means, speed to decrease faster than the error signal and means periodically interrupting the application of the error signal to the motor means.

12. Apparatus for mass centering a workpiece comprising, the combination of a holder for movably supporting the workpiece, means pivotally supporting the workpiece holder at the center of gravity thereof so that the holder will pivot from a substantially horizontal position to an inclined position representing the disposition of the mass center of the workpiece relative to the center of gravity of theh older, electromechanical means sensing the displacement of the workpiece holder from the horizontal position and developing an error signal of a corresponding amplitude, workpiece positioning means including a cam surface movable relative to the holder and engageable with the workpiece and motor means responsive to the error signal, the motor means being so arranged as to maneuver the cam surface and accordingly the workpiece relative to the holder in accordance with the amplitude of the error signal so as to align the mass center of the workpiece and the center of gravity of the holder, and a compensating network for stabilizing the operation of the motor means, the compensating network including means combining a quadrature component with the error signal so that the effective error signal applied to the motor means causes the motor means, speed to decrease faster than the error signal, and means intermittently shunting the error signal to ground.

13. Apparatus for mass centering a workpiece comprising; the combination of a holder for movably supporting the workpiece, means pivotally supporting the workpiece holder at the center of gravity thereof so that the holder will pivot from a substantially horizontal position to an inclined position representing the disposition of the mass center of the workpiece relative to the center of gravity of the holder; an electromechanical pickup including a plural pole stator having windings thereon, a pendulous armature so arranged relative to the holder as to have corresponding movement and so arranged relative to the stator as to cause a pair of error signals to be produced reflecting the displacement of the armature in two angularly related directions from a nulling position corresponding to the horizontal position of the holder; positioning means including a cam surface movable relative to the holder and engageable with the workpiece and a pair of two-phase motors each responsive to one of the error signals and so arranged as to maneuver the cam surface and accordingly the workpiece relative to the holder in one of the two angularly related directions so as to align the mass center of the workpiece with the center of gravity of the holder and thereby restore the holder to the horizontal position thereof, the two-phase motors each including a control winding energized by one of the error signals and a reference winding, an AC reference source energizing each of the reference windings; and compensating means for attenuating the error signals so as to stabilize the operation of the motors and thereby facilitate the rapid return of the holder to the normal position.

14. Apparatus for mass centering a workpiece comprising; the combination of a holder for movably supporting the workpiece; means nonrotatably and pivotally supporting the workpiece holder at the center of gravity thereof so that the holder will pivot from a substantially horizontal position to an inclined position representing the disposition of the mass center of the workpiece relative to the center of gravity of the holder, an electromechanical pickup including a plural pole stator having windings thereon, a pendulous armature so arranged relative to the holder as to have corresponding movements and so arranged relative to the stator as to cause a pair of error signals to be produced reflecting the displacement of the armature respectively in two angularly related directions from a null position corresponding to the horizontal position of the holder, positioning means including a cam surface movable relative to the holder and engageable with the workpiece and a pair of two-phase motors each responsive to one of the error signals and arranged to maneuver the cam surface and accordingly the workpiece in one of the two angularly related directions, each of the two-phase motors having reference and control windings, an AC reference source energizing each of the reference windings, the control windings each being energized by one of the error signals so that the two motors will together maneuver the workpiece until the mass center thereof is substantially aligned with the center of gravity of the holder and the holder is thereby restored to the normal position; and compensating networks for stabilizing the operation of each of the motors, the compensating networks each including means combining a phase shifted component with one of the error signals so that the effective error signal applied to the associated control winding causes the motor speed to decrease faster than the error signal, and means periodically interrupting the application of one of the error signals to the associated control winding.

15. Apparatus for mass centering a workpiece comprising; the combination of a holder for movably supporting the workpiece; means nonrotatably and pivotally supporting the workpiece holder at the center of gravity thereof so that the holder will pivot from a substantially horizontal position to an inclined position representing the disposition of the mass center of the workpiece relative to the center of gravity of the holder; means sensing the displacement of the workpiece holder from the horizontal position in two angularly related directions, the sensing means including first and second sets of oppositely arranged magnetic pickup transformers all disposed in quadrantal relation, each transformer including a core with primary and secondary windings wound thereon, each set of oppositely arranged transformers having the primary windings thereof arranged in series and the secondary windings arranged in series opposition, an exciting source for each of the primary windings, an armature so arranged relative to the holder as to have corresponding movements and so arranged relative to the cores as to cause the secondary windings of oppositely arranged transformers to produce error signal voltages having amplitudes representing the displacement of the armature in the two quadrature related directions from a null position corresponding to the horizontal position of the holder; positioning means including a pair of spaced cams revolvably positioned on the holder, a pair of two-phase motors one for revolving each cam, each motor including a control winding responsive to one of the error signal voltages so as to maneuver the workpiece in one of two angularly related directions and thereby align the mass center of the workpiece with the center of gravity of the holder and accordingly restoring the holder to the horizontal position thereof; and compensating networks for stabilizing the operation of the motors, the compensating networks each including means combining a quadrature component with one of the error signal voltages so that the effective error signal voltage supplied to the control winding causes the motor speed to decrease faster than the error signal and means periodically interrupting the application of the error signal voltage to the control winding.

16. Apparatus for mass centering a workpiece comprising; the combination of a holder for movably supporting a workpiece; air bearing means pivotally and nonrotatably supporting the workpiece holder at the center of gravity thereof so that the holder will pivot from a substantially horizontal position to an inclined position representing the disposition of the mass center of the workpiece relative to the center of gravity of the holder, an electromechanical pickup including a plural pole stator having windings thereon, a pendulous armature so arranged relative to the holder so as to have corresponding movements and so arranged relative to the stator as to cause output error signals to be produced reflecting displacement of the armature in two angularly related directions from a null position in which the error signals are nulled, the null position corresponding to the horizontal position of the holder; positioning means including a pair of two-phase motors each responsive to one of the error signals and so arranged as to maneuver the workpiece in one of the two angularly related directions relative to the holder so as to align the mass center of the workpiece with the center of gravity of the holder and thereby restore the holder to the horizontal position thereof, the two-phase motors each including a control winding responsive to one of the output error signals and a reference source energizing the reference windings; and compensating means altering the error signals so as to stabilize the operation of the motors.

17. Apparatus for mass centering a workpiece comprising; the combination of a holder for movably supporting a workpiece; air bearing means nonrotatably and pivotally supporting the workpiece holder at the center of gravity thereof so that the holder will pivot from a substantially horizontal position to an inclined position representing the disposition of the mass center of the workpiece relative to the center of gravity of the holder;

electromechanical means sensing the displacement of the workpiece holder from the horizontal position in two quadrature related directions; the sensing means including first and second sets of oppositely arranged magnetic pickup transformers disposed in quadrantal relation, each transformer including a core with primary and secondary windings wound thereon, each set of oppositely arranged transformers having the primary windings arranged in series and the secondary windings in series opposition, an AC source energizing each of the primary windings with the same phase excitation, a pendulous armature so arranged relative to the holder as to have corresponding movements and so arranged relative to the cores as to cause the secondary windings of oppositely arranged transformers to produce error signal voltages having the same phase and having amplitudes representing the displacement of the armature in the two quadrature related directions from a nulled voltage position corresponding to the horizontal position of the holder, a pair of positioning means including a pair of 90° spaced cams revolvably positioned on the holder about offset axes and operative to maneuver the workpiece in the two quadrature related directions, a compensating weight revolvable with each cam and so positioned relative to the axis thereof as to compensate for mass center changes produced by the rotation of the cam, a pair of two-phase motors, one for revolving each cam in response to one of the error signal voltages so as to maneuver the workpiece in one of the two quadrature related directions and thereby align the mass center of the workpiece with the center of gravity of the holder and accordingly restore the holder to the horizontal position thereof, each motor including a reference winding energized by the AC source and a control winding, means phase adjusting each of the error signal voltages and applying each of the phase adjusted error signal voltages to one of the control windings; compensating networks for stabilizing the operation of the motors, the compensating networks each including means combining a quadrature component with each of the error signal voltages so that the effective error signal voltage impressed on the control windings of each motor causes the motor speed to decrease faster than the error signal, and means intermittently shunting each of the error signal voltages to ground; and a motor for lifting the workpiece and the workpiece holder from the air bearing means for permitting the workpiece to be machined in accordance with the established mass center.

References Cited

UNITED STATES PATENTS

| | | | |
|---|---|---|---|
| 2,515,969 | 7/1950 | Shivers | 318—489 X |
| 2,676,290 | 4/1954 | Ciscel. | |
| 2,947,175 | 8/1960 | King et al. | 73—483 |

ORIS L. RADER, *Primary Examiner.*

T. E. LYNCH, *Assistant Examiner.*

U.S. Cl. X.R.

73—461; 318—448, 489

UNITED STATES PATENT OFFICE
CERTIFICATE OF CORRECTION

Patent No. 3,436,626                                            April 1, 1969

Charles W. Phelps et al.

It is certified that error appears in the above identified patent and that said Letters Patent are hereby corrected as shown below:

Column 1, line 25, "guadrature" should read -- quadrature --; line 51, after "holder" insert -- and then accurately positions the workpiece on the holder --. Column 3, line 50, "principles" should read -- principle --. Column 4, line 9, cancel "displaced"; line 35, "understod" should read -- understood --. Column 5, line 29, "amplifier" should read -- amplified --; same line 29, "axed" should read -- axes --; lines 36, 43 and 45, after "holder", "14", each occurrence, should read -- 10 --. Column 6, line 7, "dispostiion" should read -- disposition --; line 57, "portion" should read -- position --. Column 7, line 3, "workpece" should read -- workpiece --; line 45, "on" should read -- of --. Column 8, lines 4 and 51, and column 9, line 2, "means,", each occurrence, should read -- means --. Column 8, line 61, "theh older" should read -- the holder --. Column 9, line 15, "movement" should read -- movements --. Column 10, line 64, after "reference" insert -- winding, a reference --.

Signed and sealed this 14th day of April 1970.

(SEAL)
Attest:

EDWARD M. FLETCHER, JR.                                        WILLIAM E. SCHUYLER, JR.
Attesting Officer                                                       Commissioner of Patents